Nov. 29, 1949     J. JOHNSON     2,489,491
PULSATION ABSORBER
Filed Jan. 12, 1946
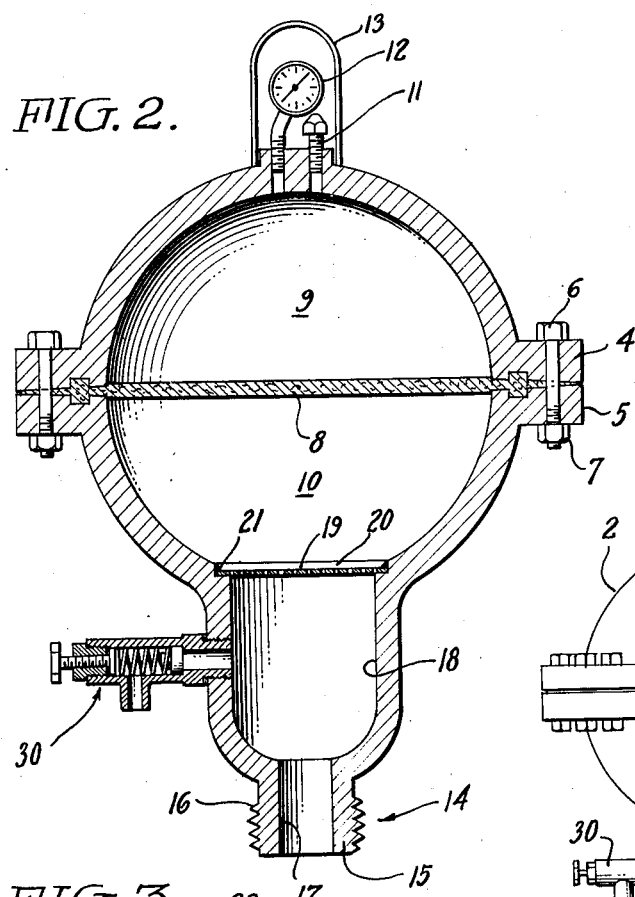
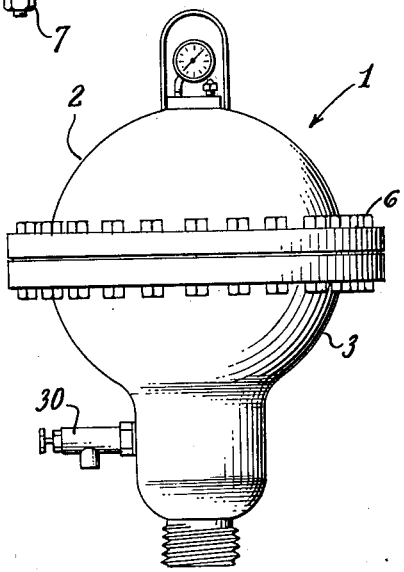
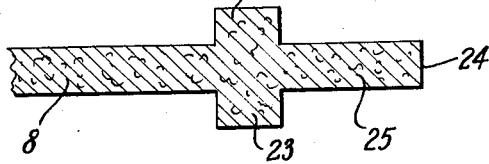
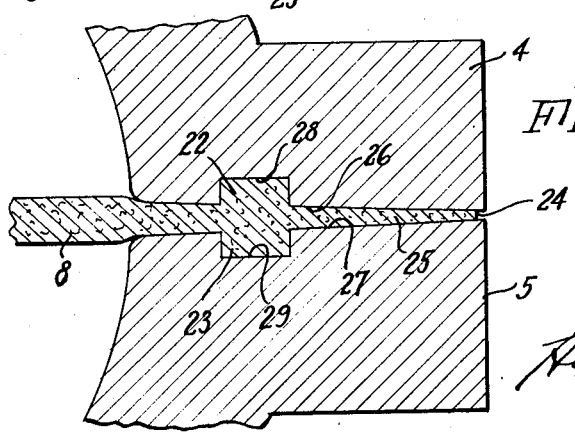
INVENTOR.
JACK JOHNSON.
BY
Harold W. Mattingly
ATTORNEY Patented Nov. 29, 1949

2,489,491

UNITED STATES PATENT OFFICE 2,489,491

PULSATION ABSORBER

Jack Johnson, Long Beach, Calif., assignor to Lou-Son Development Co., Long Beach, Calif., a corporation of California Application January 12, 1946, Serial No. 640,964

1 Claim. (Cl. 138—30)

My invention relates to a pulsation absorber, and has particular reference to a device adapted to absorb or smooth out the fluctuations in pressure in a fluid system through which fluid is pumped by a reciprocating pump mechanism.

In many hydraulic systems, a pump employing reciprocating pistons is used for the purpose of pumping fluid through the system, the reciprocating of the pump pistons resulting in a flow of fluid through the system in a series of pulsations of relatively high pressure alternating with periods of low pressure resulting from the action on the fluid by the reciprocating pistons of the pump. In many instances, particularly those in which a relatively high pressure is required, or a relatively large volume of fluid is displaced upon each stroke of the pump pistons, the resulting pulsations in the system cause undesired effects such as creating vibrations in the system resulting in damage to pipes, hoses, or other conduits employed to conduct the hydraulic fluid, and imposing undesirable and unnecessary strains upon various pieces of apparatus employed in the system.

One system of this character is the hydraulic system employed for circulating fluid through a string of drill pipe during the drilling of deep wells in which the circulating fluid is passed down through the string of drill pipe for the purpose of washing out and removing the cuttings made by the bit. In such systems it is the common practice to interconnect the string of drill pipe with the circulation pump by means of either flexible hoses or jointed pipes through which the fluid is passed from the pump to the drill string proper. In many instances, the pressures which are required to be employed for the circulating fluid are extremely high, and the pulsations of the pump are transmitted through the flexible pipe or hose to the upper end of the drill string, resulting in an undesired and dangerous vibration of the upper end of the drill string, the traveling block and cables of the hoisting system employed to suspend the drill string during the drilling operations.

It is therefore an object of my invention to provide a device for absorbing the pulsations resulting from the reciprocating of the fluid pump pistons to thereby cause a substantially uniform flow of fluid from the pump to the hydraulic system supplied by the pump.

Another object of my invention is to provide a pulsation absorbing device of the character described which is simple in its construction and inexpensive to manufacture.

It is also an object of my invention to provide a pulsation absorber of the character set forth in the preceding paragraphs which comprises a chamber divided into two parts by means of a flexible diaphragm, one part being communicated with the discharge of the reciprocating pump and the other part being filled with gas or air at a pressure substantially greater than atmospheric.

It is an additional object of my invention to provide a device of the character set forth in the preceding paragraph in which the connection means for attachment to the discharge line of the pump includes a portion of larger diameter to effectively reduce the velocity of flow of fluid into and out of the chamber.

It is a still further object of my invention to provide a device of the character set forth hereinbefore which includes a perforated plate disposed between the inlet connection and the flexible diaphragm to break up the liquid flow and prevent undue scoring or abrasion of the diaphragm particularly when the device is used on a well fluid circulating system.

Other objects and advantages of my invention will be apparent from a study of the following specifications, read in connection with the accompanying drawings, wherein:

Fig. 1 is a side elevational view illustrating the form and appearance of the preferred embodiment of my invention;

Fig. 2 is a longitudinal sectional view taken through the device shown in Fig. 1;

Fig. 3 is an enlarged fragmentary sectional view illustrating the configuration of the edge portion of the flexible diaphragm before the diaphragm is installed; and Fig. 4 is an enlarged fragmentary sectional view showing the manner in which the edge portion of the diaphragm is deformed by being clamped between the two halves of the device to establish an adequate high pressure fluid seal.

Referring to the drawings, I have illustrated the preferred embodiment of my invention as comprising a substantially spherical housing indicated generally at 1 and formed of two substantially hemispherical housing members 2 and 3. The members 2 and 3 are both provided with radially extending flanges 4 and 5 permitting the two members 2 and 3 to be assembled to each other along an equatorial plane as by means of a plurality of bolts 6 and nuts 7 passed through both of the flanges 4 and 5.

Between the two housing members 2 and 3 I place a flexible diaphragm 8, the diaphragm having a diameter sufficient to extend between the flanges 4 and 5 so as to be clamped between those flanges and establish a fluid seal. The diaphragm 8 is preferably formed of a flexible abrasion-resistant material such as rubber, synthetic rubber or like compound and serves to divide the interior space within the spherical housing 1 into two parts 9 and 10. The part 9 is intended to be filled with air or gas under pressure and to this end there is provided a suitable filling fixture 11 by means of which gas under pressure may be introduced into the space 9. If desired, a pressure gauge 12 may be communicated with the part 9 to indicate the internal pressure within the pulsation absorber. Preferably a guard member 13 is employed to protect the gauge 12 from mechanical injury.

While the part 9 may be filled with any elastic fluid, I prefer to use an inert or non-inflammable gas and preferably exclude any gas which will support combustion as, for example, oxygen. I have found that nitrogen under pressure is eminently suitable as an elastic fluid to be used for filling the part 9.

To the under side of the lower housing member 3 I provide a connection means indicated generally at 14 by means of which the device may be connected into the fluid line leading from the discharge of a reciprocating pump. In the form shown in the drawings, the connection means comprises a nipple 15 which is externally threaded as with pipe threads 16. The nipple 15 defines a fluid passage 17 which is enlarged as shown at 18 in that portion which is contiguous to the space 10 so that fluid flowing in and out of the part 10 through the passage 17 during operation of the reciprocating pump will be subjected to a material reduction of velocity to minimize the velocity head effects on the diaphragm 8 and to prevent undue abrasion and scoring of the diaphragm resulting from the projection of solid particles, such as sand, grit and the like against the face of the diaphragm.

A further break up of the flow of fluid into the part 10 may be effected by interposing between the passage 17 and the chamber portion 10 a perforated plate member 19 which is preferably placed within a recess 20 comprising a counterbore in the enlarged bore portion 18 and by securing the plate 19 within the counterbore 20 as by means of welding 21.

In order that an adequate fluid seal may be established at the junction of the flanges 4 and 5 I prefer to form the diaphragm 8 with a peripheral edge portion of the character which is shown in Fig. 3. This portion includes a pair of rectangular ribs 22 and 23 formed integrally with the diaphragm 8 and disposed on opposite surfaces thereof. These ribs are placed inwardly of the outermost edge 24 of the diaphragm to define a radially extending flange portion 25.

As is shown in Fig. 4, the flanges 4 and 5 are provided with tapered meeting surfaces 26 and 27, the taper being in such direction that the surfaces 26 and 27 recede from each other in progressing from the outside of the device toward the inside thereof. The surfaces 26 and 27 are interrupted by circumferentially extending grooves 28 and 29 of rectangular cross-section adapted to receive the ribs 22 and 23. As the flanges 4 and 5 are drawn toward each other by means of the clamping bolts 6, the ribs 22 and 23 and the flange portion 25 are compressed to fill the recesses 28 and 29 and to extrude the flange 25 outwardly to a point near the outer edge of the flanges 4 and 5 as is shown in Fig. 4. The tremendous clamping pressures which are developed by the clamping bolts 6 serve to establish an adequate fluid seal at the contacting surfaces of the flanges with the diaphragm and the ribs 22 and 23 serve as keys to prevent the material of the diaphragm from sliding from between the meeting faces of the flanges.

It is oftentimes desirable to operate a plurality of reciprocating pumps with their discharges connected in parallel with each other. Since such pumps are usually independently driven, they also usually operate at different speeds so that on occasion two or more of such parallel pumps will deliver their power stroke at the same time. Under these circumstances the pressure surge may be excessive and sufficient to explode the housing 1 or rupture the diaphragm 8 if some means for limiting such pressure surges were not provided. Accordingly, I prefer to include a pressure relief valve 30 which may be of conventional construction and which is arranged to communicate the enlarged bore portion 18 with the atmosphere upon a rise in pressure within the device to a value above a predetermined safe value.

The device described is suitable for use as a pulsation absorber by connection to the discharge line of a reciprocating pump and may be used with substantially any type of hydraulic pumping system. The device, however, finds particular utility when employed in connection with the mud circulating systems of oil well drilling equipment since these systems are operated at very high pressures and deliver fluids carrying a great amount of abrasive material. By using the flexible diaphragm 8 and filling the chamber portion 9 with gas under pressure, I am enabled to adequately smooth out the pressure surges occurring during the operation of such a system with a device which is relatively small and light in weight as compared with conventional types of surge chamber constructions.

While I have shown and described the preferred embodiment of my invention, I do not desire to be limited to any of the details of construction shown or described herein, except as defined in the appended claim.

I claim:

For use in a hydraulic system including a plurality of reciprocating pumps having the discharges thereof connected in parallel, a pulsation absorber comprising: a housing defining a chamber; a flexible diaphragm dividing said chamber into two parts; connection means communicating with one of said parts for attachment to said discharge; and a pressure relief valve connected to communicate said one part with the atmosphere upon a rise in pressure in said one part to a value exceeding a predetermined value.

JACK JOHNSON.

REFERENCES CITED

The following references are of record in the file of this patent:

UNITED STATES PATENTS

| Number | Name | Date |
|---|---|---|
| 1,824,342 | Gillen et al. | Sept. 22, 1931 |
| 2,324,701 | Herman | July 20, 1943 |
| 2,342,356 | Mercier | Feb. 22, 1944 |
| 2,371,632 | Lippincott | Mar. 20, 1945 |
| 2,385,016 | Mercier | Sept. 18, 1945 |
| 2,389,791 | Lippincott | Nov. 27, 1945 |
| 2,394,401 | Overbeke | Feb. 5, 1946 |